United States Patent
Anderson

(10) Patent No.: US 7,364,803 B1
(45) Date of Patent: Apr. 29, 2008

(54) HIGH DENSITY DUAL HELICAL GEAR AND METHOD FOR MANUFACTURE THEREOF

(75) Inventor: Gary L. Anderson, St. Marys, PA (US)

(73) Assignee: Keystone Investment Corporation, Wilmington, DE (US)

( * ) Notice: Subject to any disclaimer, the term of this patent is extended or adjusted under 35 U.S.C. 154(b) by 260 days.

(21) Appl. No.: 11/158,186

(22) Filed: Jun. 21, 2005

Related U.S. Application Data

(60) Provisional application No. 60/587,740, filed on Jul. 14, 2004, now abandoned.

(51) Int. Cl.
*B22F 3/17* (2006.01)
*B22F 5/08* (2006.01)
*B23P 15/14* (2006.01)

(52) U.S. Cl. ............. 428/687; 428/546; 428/573; 428/601; 419/48; 419/66

(58) Field of Classification Search ............. None
See application file for complete search history.

(56) References Cited

U.S. PATENT DOCUMENTS

| | | | |
|---|---|---|---|
| 3,891,367 A | 6/1975 | Signora | 425/78 |
| 4,712,411 A | 12/1987 | Goodwin | 72/344 |
| 5,390,414 A | 2/1995 | Lisowsky | 29/893 |
| 6,165,400 A | 12/2000 | Hinzmann | 264/120 |
| 6,592,809 B1 | 7/2003 | Anderson et al. | 419/28 |
| 6,630,101 B2* | 10/2003 | Anderson et al. | 419/25 |
| 2005/0279430 A1* | 12/2005 | Hoffman et al. | 148/586 |

* cited by examiner

*Primary Examiner*—Keith D. Hendricks
*Assistant Examiner*—Jason L. Savage
(74) *Attorney, Agent, or Firm*—Alvin T. Rockhill; Kathleen K. Bowen; Edwin A. Sissor

(57) ABSTRACT

The present invention relates to a low cost technique for manufacturing dual helical gears, such as herringbone gears, from powder metals. The dual helical gears made by this technique are of high density (greater than 92% of theoretical density) and offer superior strength. The present invention more specifically discloses a forged metal herringbone gear which is comprised of a body and a plurality of teeth wherein the metal has a density of greater than 92% of theoretical and wherein the grain in the teeth is one range higher on the ASTM E 112 grain size chart than the grain in the body of the gear. The present invention also discloses a method for manufacturing a high density forged dual helical gear.

6 Claims, 10 Drawing Sheets

HIGH DENSITY DUAL HELICAL GEAR AND METHOD FOR MANUFACTURE THEREOF

This application claims the benefit of U.S. Provisional Patent Application Ser. No. 60/587,740, filed on Jul. 14, 2004 (now abandoned) and incorporates the teachings thereof herein by reference in their entirety.

BACKGROUND OF THE INVENTION

The production of powdered metal articles, including gears, is well-known in the art. One can use a single type of powdered metal or, depending upon the properties desired, one can use different types metal powders blended together. The powder is disposed in a mold cavity which can be a simple cylindrical preform or may have the profile of the finished product. Then, pressure is applied to create the preform. The preform can then be removed and sintered to produce the part. Where a cylindrical preform is used, the preform is placed in another mold and more pressure is applied to form an article having the desired shape. This new preform can then be sintered.

Apparatus for forming helical gears are also known in the art wherein portions of the mold rotate when the preform is impacted to cause the preform to take the shape of the helical gear. For example, such an apparatus having rotating parts for producing powdered metal helical gears is disclosed in U.S. Pat. No. 3,891,367 to Signora. In Signora, the preform has the shape of the actual helical gear to be produced, in contrast to first forming a cylindrical preform which is later transformed into a helical gear.

U.S. Pat. No. 4,712,411 to Goodwin discloses an apparatus for making a fully dense powdered metal single helical gear. Goodwin generally describes producing the helical gear by first creating a cylindrical preform by sintering. The cylindrical preform is then placed in a forming mold wherein the mold cavity has the specific geometry of the helical gear. The preform is then heated and placed in the forming mold where it is axially impacted with an unprofiled punch to both impact the helical toothed shape and also to densify the gear. A disadvantage of the method employed by Goodwin can be that when the preform is impacted a lot of flashing can result as the preform is forced into the shape of the helical gear and the metal passes through the gap of the unprofiled punch and the profile of the teeth. Consequently, additional finishing processes can be required to clean up the gear before it is acceptable to a customer.

Both Signora and Goodwin utilize mechanically created pressure to form the gear. However, it is also known to utilize isostatic pressure to form a helical powdered metal gear. For example, U.S. Pat. No. 5,390,414 to Lisowsky discloses a method of manufacturing a helical gear from powered metal using hot and cold isostatic pressure. Like Goodwin, Lisowsky employs a first mold to create a simple cylindrical preform having only the general geometry of the intended gear. A second mold is provided having the specific geometry of the gear and is slightly larger than the preform. The preform is placed inside the second mold, wherein additional powdered metal is provided around the preform to produce a second preform having a helical gear shape. Cold isostatic pressure is used to create both the simple preform and the helical gear preform. After the helical gear preform is made, hot isostatic pressure and/or sintering is employed to create the densified helical gear.

Isostatic pressure forming can generally involve placing a gear preform within a mold cavity having the specific geometry of the helical gear. A rubber bladder is inserted through a center bore in the gear. Fluid is pumped into the rubber bladder at extremely high pressures thus radially expanding the preform against the walls of the mold cavity and causing it to take on the helical gear shape. A disadvantage with isostatic forming is that it can take much longer for the process to fully densify the gear. In hot forming, enormous amounts of pressure can be generated in an instant by impacting the gear axially. In contrast, with isostatic pressure it can take time to build up the pressure and it may be preferable to keep the gear subjected to the pressure for a relatively long time to ensure that the preform fully takes on the specific geometry of the helical gear. Also, for example, obtaining accurate dimensions in the axial direction can be difficult when using isostatic pressure forming. There is generally no mold abutting the axial ends of the gear because the bladder must be inserted through a center bore in the gear. Thus, the axial dimension can be difficult to accurately control. Consequently, more finishing steps can be required to obtain final dimensions having the desired accuracy. Moreover, besides controlling the length of the gear, the lack of control over the axial dimension can also make it more difficult to fully densify the gear. This is because without control over the axial dimension, the gear can experience some undesirable axial expansion in addition to the radial expansion. Consequently, instead of compacting all of the molecules of the gear together, as would occur if both the radial and axial dimensions were controlled, the gear lengthens somewhat which results in a longer and less dense gear.

U.S. Pat. No. 6,592,809 to Anderson discloses a method for producing a fully dense powder metal single helical gear including placing powder metal in a preform die wherein it can be compacted axially by punches to create a gear preform having various gear profiles, such as a helical profile, sintering the preform, and inserting the sintered preform into a hot forming die wherein it is impacted axially by punches to fully densify the gear preform. The densified gear can then be inserted in a burnishing die where a more precise gear profile can be imparted resulting in more precise dimensions. Anderson further indicates that finishing treatments, such as rolling, shaving, heat treating, machining to length and inner diameter sizing can be subsequently performed as desired.

In comparing common types of power transmission gears, a helical gear which has angled teeth typically has a higher load carrying capacity than the common spur gear, which has straight-cut teeth, of the same size. Also, because the helical gear runs more smoothly than the correspondingly spur gear, helical gears can normally operate at much higher speeds than can spur gears. However, in operation helical gears also create an axial thrust which may have to be absorbed by the bearings if same are employed to carry the gear. Relatively expensive bearings such as thrust bearings are normally employed to absorb such axial forces.

The advantages of a helical gear can be obtained, without the requirement of thrust bearings, however, through use of a dual helical gear known as a herringbone gear. In general, a dual helical gear has a helical profile on one side of a parting plane and an opposite helical profile on the other side of the parting plane. These two profiles can be an opposed helix, a helix of different pitch of the same hand, or out of phase helix, or a spur gear, whether of the same diameter or tooth height or not. The special case of symmetrically opposed helical gears is referred to as a herringbone design.

A herringbone gear is constructed of two adjacent rows of helical or angled gear teeth which extend around the circumference of the gear with the two rows of teeth being oppositely angled. By providing the two rows of oppositely angled gear teeth, axial forces normally created by a helical gear, are avoided. Any axial thrust created by one row of angled teeth is cancelled by the opposite acting reaction axial thrust created by the other row of angled teeth. Overall, herringbone gears possess advantages over other gear types in that (1) there is a continuous smooth meshing of gear teeth; (2) they afford greater strength; (3) there is the absence of end or axial thrust as noted above; (4) they may be operated at high peripheral speeds; and (5) they possess the ability to withstand shock loads and loads of a vibrating nature because of very low backlash.

Herringbone gears, however, requiring complex machine tools and are difficult and costly to manufacture. Consequently, the cost of herringbone gears is quite high. In fact, though herringbone gears are often preferred in certain mechanical applications, cost has historically prevented their widespread utilization and lesser desirable gears have been employed in their place.

Since it is difficult and costly to manufacture dual helical gears such as herringbone gears utilizing conventional technology, the advantages of manufacturing such gears by compacting and sintering a powder metal are readily apparent. U.S. Pat. No. 6,165,400 to Hinzmann discloses such as technique. More specifically, Hinzmann reveals a method of forming a powder compact in a tool set having a pair of opposed die and punch sets each having a die and a punch co-operating with said die to define respective chambers, said method comprising the steps of: (a) establishing said tool set in a closed position, with said chambers in closed communication to form a closed cavity containing a charge of powder; (b) advancing said punches toward each other along an axis to compress the charge of powder and thereby to form the compact; (c) maintaining said punches at a fixed spacing from each other while moving each of said dies along the axis to separate the dies and expose the compact; (d) rotating at least one of said dies about the axis as it moves along said axis; and (e) ejecting the compact from said tool set. However, the gears made by the powder metal technique of Hinzmann are not of high density.

SUMMARY OF THE INVENTION

The present invention relates to a low cost technique for manufacturing dual helical gears, such as herringbone gears, from powder metals. The dual helical gears made by this technique are of high density (greater than 92% of theoretical density) and offer superior strength.

The technique of the present invention uses a sintered preform and forges the metal into the teeth of a split mold to achieve the high density dual helical gear. Forging describes the process whereby the pressure causes the metal of the preform to flow radially into the teeth of the gear. The high density achieved by forging the metal gear is superior to density achieved by axially compacting the pre-shaped gear. In the forged gear, the primary flow of the metal into the gear teeth radiates outward from the center of the gear into the teeth cavities of the mold. By contrast, in the axially compacted gear, the teeth of either the part or the preform are formed by placing the uncompacted powder into the teeth cavities and then axially compacting the powder. This creates very little radial flow as the metal powder has already been placed into the teeth. Density is achieved primarily through compaction in the axial direction.

The attached micrographs in FIGS. 7 and 8 taken at 160× magnification show the differences of these flow patterns. FIG. 7 is a micrograph of the teeth of the gear with radial flow. By comparison, FIG. 8 is a micrograph of the teeth without radial flow (axial compaction). The microstructure of the axial compaction without flow (FIG. 8) has much larger distinct resolvable structures than does the forged metal gear with flow (FIG. 7). These parts can also be scaled using ASTM E 112 with the microstructure with flow.

The present invention more specifically discloses a forged metal herringbone gear which is comprised of a body and a plurality of teeth wherein the metal has a density of greater than 92% of theoretical and wherein the grain in the teeth is one range higher on the ASTM E 112 grain size chart than the grain in the body of the gear.

The subject invention further reveals a high density forged dual helical gear produced by a method comprising the steps:

placing a heated sintered powder metal preform in a split mold cavity of a spilt mold die having a top die and a bottom die, wherein said top die has a top mold cavity and said bottom die has a bottom mold cavity, wherein said top mold cavity is a first helical gear shaped cavity, and said bottom mold cavity is a second helical gear shaped cavity, wherein at least one of said top die or bottom die is a rotating die member;

axially impacting the heated sintered powder metal preform with an upper punch and a lower punch, wherein at least one of said upper punch or said lower punch have teeth which mate with said first helical gear shape or said second helical gear shape respectively, and wherein whichever punch has teeth which mate with a helical gear shape is a rotating punch, wherein said heated sintered powder metal preform is axially impacted with sufficient force to densify said preform into the high density forged dual helical gear.

The present invention also discloses a high density forged internal dual helical gear produced by a method comprising the steps:

placing a heated sintered powder metal preform in a spilt mold die having a top die and a bottom die, wherein said top die has a top mold cavity and said bottom die has a bottom mold cavity, wherein said top mold cavity has a top core rod with a first helical gear profile, and said bottom mold cavity has a bottom core rod with a second helical gear profile, wherein at least one of said top core rod or bottom core rod is a rotating core rod;

axially impacting the heated sintered powder metal preform with an upper punch and a lower punch, wherein at least one of said upper punch or said lower punch have teeth which mate with said first helical gear profile or said second helical gear profile respectively, and wherein whichever punch has teeth which mate with a helical gear profile is a rotating punch, and further if one of said top core rod or said bottom core rod is a non-rotating core rod, the corresponding punch is a rotating punch with a mating helical gear profile, wherein said heated sintered powder metal preform is axially impacted with sufficient force to densify said preform into the high density forged internal dual helical gear.

The subject invention further reveals a high density forged dual helical gear having an external first helical gear profile and an internal second helical gear profile, produced by a method comprising the steps:

placing a heated sintered powder metal preform in a split mold cavity of a spilt mold die having a top die and a bottom die, wherein said top die has a top mold cavity and said bottom die has a bottom mold cavity, wherein said top mold cavity is a first helical gear profile shaped cavity, and said bottom mold cavity has a bottom core rod with a second helical gear profile, wherein said top is a rotating die member;

axially impacting the heated sintered powder metal preform with an upper punch and a lower punch, wherein at least one of said upper punch or said lower punch have teeth which mate with said first helical gear profile or said second helical gear profile respectively, and wherein whichever punch has teeth which mate with a helical gear profile is a rotating punch, wherein said heated sintered powder metal preform is axially impacted with sufficient force to densify said preform into the high density forged dual helical gear.

The present invention also discloses a method for manufacturing a high density forged dual helical gear comprising the steps of (1) placing a heated sintered powder metal preform in a split mold cavity of a spilt mold die having a top die and a bottom die, wherein said top die has a top mold cavity and said bottom die has a bottom mold cavity, wherein said top mold cavity is a first helical gear shaped cavity, and said bottom mold cavity is a second helical gear shaped cavity, wherein at least one of said top die or bottom die is a rotating die member; (2) axially impacting the heated sintered powder metal preform with an upper punch and a lower punch, wherein at least one of said upper punch or said lower punch have teeth which mate with said first helical gear shape or said second helical gear shape respectively, and wherein whichever punch has teeth which mate with a helical gear shape is a rotating punch, wherein said heated sintered powder metal preform is axially impacted with sufficient force to densify said preform into the high density forged dual helical gear, and wherein the sintered powder metal preform is at a temperature within the range of 1400° F. to 2000° F. at the time of the axial impacting; (3) recovering the high density forged dual helical gear from the die cavity; and (4) allowing the high density forged dual helical gear to cool to room temperature.

DETAILED DESCRIPTION OF THE INVENTION

The present invention will now be described in terms of a method for forming dual helical metal gears and is particularly useful for manufacturing herringbone gears. It should be understood that the Figures and descriptions of the present invention have been simplified to illustrate elements that are relevant for a clear understanding of the present invention, while eliminating, for purposes of clarity, other elements and/or descriptions that are well-known to those skilled in the art. Those of ordinary skill in the art will recognize that other elements may be desirable in order to implement the present invention. However, because such elements are well known in the art, and because they do not facilitate a better understanding of the present invention, a discussion of such elements is not provided herein. Various aspects of the invention are presented in FIGS. 1-6 which are not drawn to scale and in which like components are numbered alike.

Figure 1:
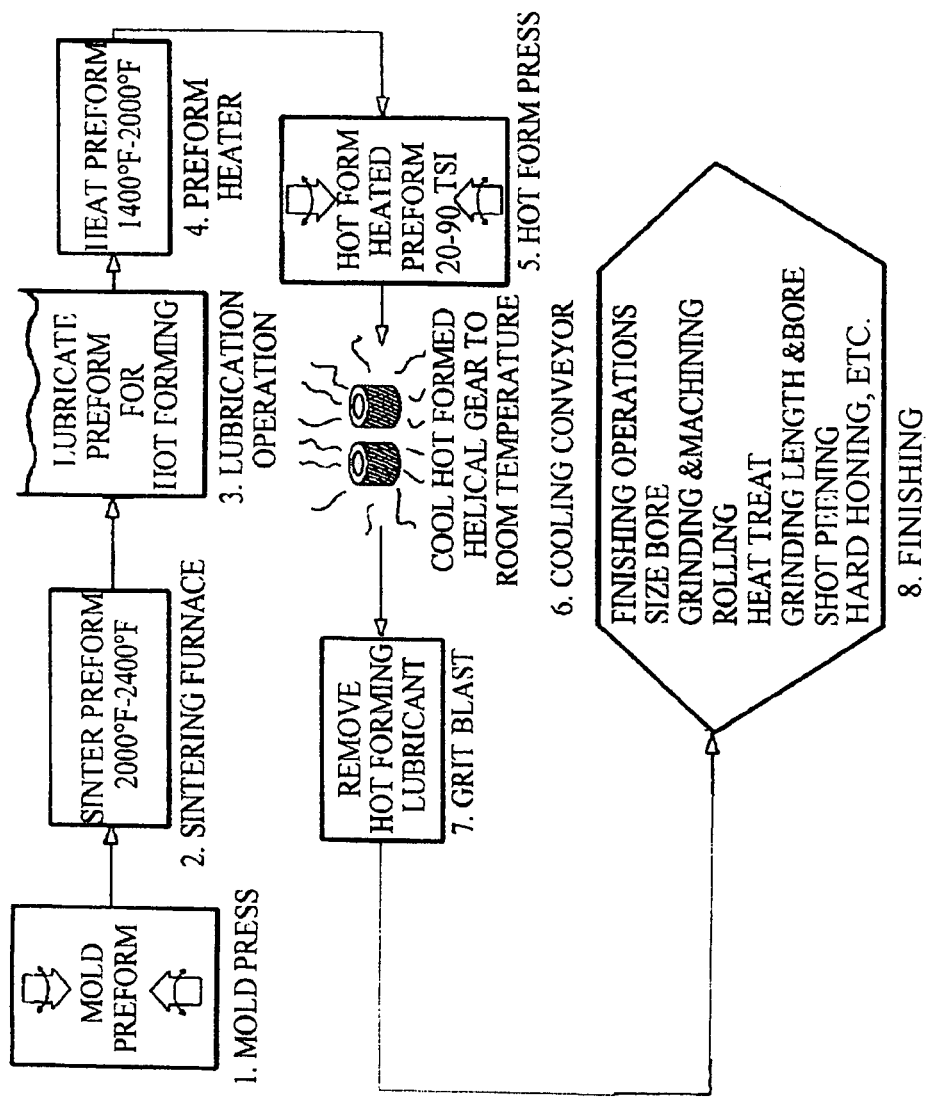
FIG. 1 is a flow chart of a gear forming and densification process according to an aspect of the invention.

FIG. 1 is directed to one embodiment of this invention wherein a high density forged dual helical gear is produced by the method which is schematically illustrated. For purposes of this invention, high density is considered to be a density of greater than 94% of theoretical. It is preferred for the high density dual helical gears of this invention to have a density of greater than 96% of theoretical with densities of greater than 98% being more preferred.

Figure 3:
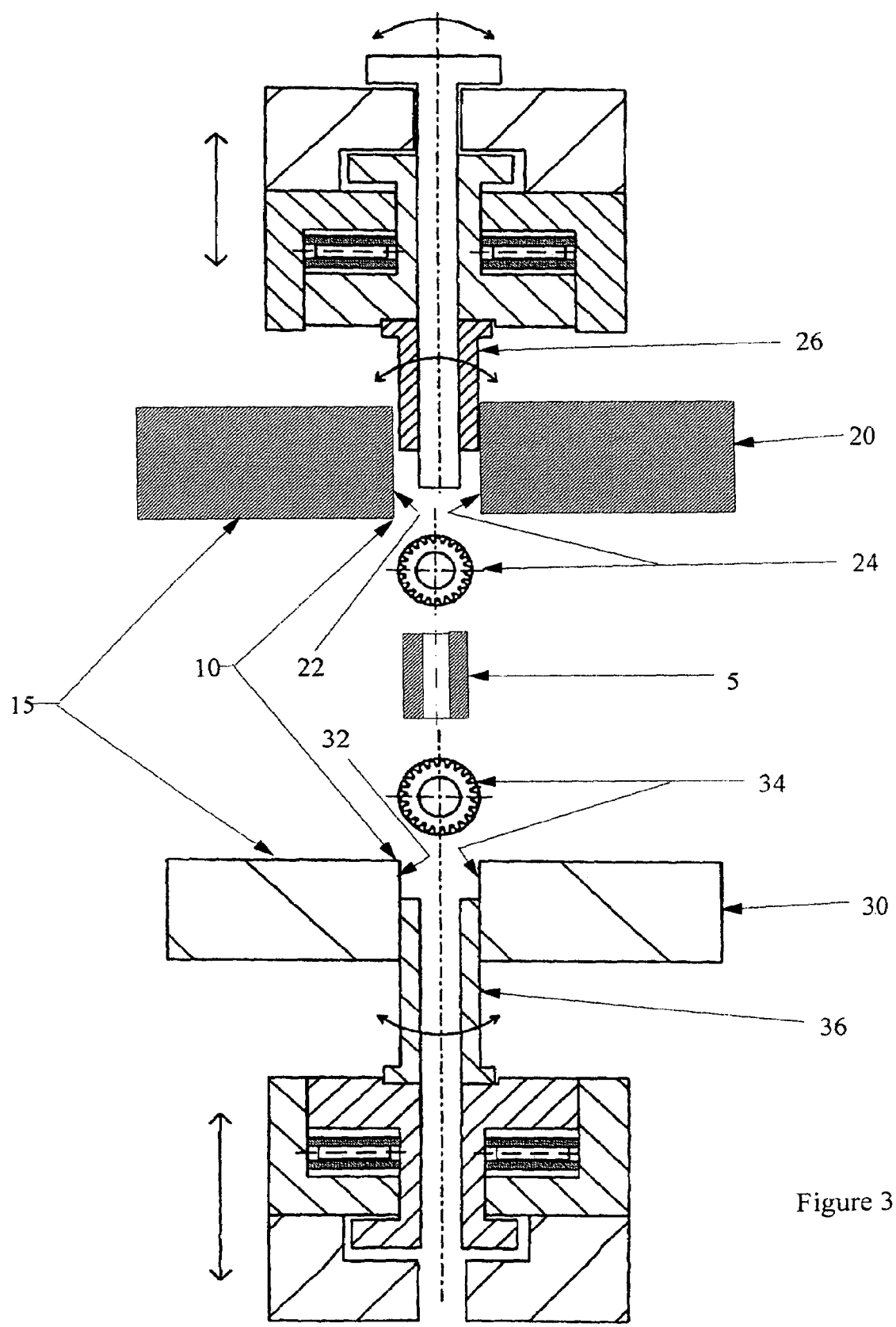
FIG. 3 is a sectional view of a gear press according to an aspect of the invention.

In the first step of the process illustrated in FIG. 1, a preform is made by the compaction of powder metal in a preform die. The powder metal can be axially compacted with enough force to generate sufficient pressure to create a preform having the general geometry of the desired dual helical gear. To attain superior strength the preform will not normally include gear teeth. In other words, the perform 5 can be in the simple shape of a toroid (as shown in FIG. 3). However, in an alternative embodiment of this invention the preform can have partially of fully developed teeth. The compaction is achieved by impacting the powder metal within the die cavity utilizing a pressure that is typically within the range of 20 tsi (tons per inch$^2$) to 60 tsi.

The metal powders that can be utilized in manufacturing dual helical gears of this invention are typically a substantially homogenous powder including a single alloyed or unalloyed metal powder or a blend of one or more such powders and, optionally, other metallurgical and non-metallurgical additives such as, for example, lubricants. Thus, "metallurgical powder" may refer to a single powder or to a powder blend. There are three common types of powders used to make powder metal mixes and parts. The most common are homogeneous elemental powders such as iron, copper, nickel and molybdenum. These are blended together, along with additives such as lubricants and graphite, and molded as a mixture. A second possibility is to use various alloyed powders, such as an iron-nickel-molybdenum steel or iron-chromium-molybdenum steel. In this case, the alloy is formed in the melt prior to atomization and each powder particle is a small ingot having the same composition as the melt. Again, additives of graphite, lubricant and elemental powders may be added to make the mix. A third type is known as "diffusion bonded" powders. In this case, an elemental powder, such as iron, is mixed with a second elemental powder or oxide of a powder, and is subsequently sintered at low temperatures so partial diffusion of the powders occurs. This yields a powder with fairly good compressibility which shows little tendency to separate during processing. While iron is the most common metal powder, powders of other metals such as aluminum, copper, tungsten, molybdenum and the like may also be used. Also, as used herein, an "iron metal powder" is a powder in which the total weight of iron and iron alloy powder is at least 50 percent of the powder's total weight. While more than 50% of the part's composition is iron, the powder may include other elements such as carbon, sulfur, phosphorus, manganese, molybdenum, nickel, silicon, chromium, and copper.

At least four types of metallic iron powders are available. Electrolytic iron, sponge iron, carbonyl iron and nanoparticle sized iron are made by a number of processes. Electrolytic iron is made via the electrolysis of iron oxide, and is available in annealed and unannealed form from, for example, OM Group, Inc., which is now owned by North American Höganäs, Inc. Sponge iron is also available from North American Höganäs, Inc. There are at least two types of sponge iron: hydrogen-reduced sponge iron and carbon monoxide-reduced sponge iron. Carbonyl iron powder is commercially available from Reade Advanced Materials. It is manufactured using a carbonyl decomposition process.

Depending upon the type of iron selected, the particles may vary widely in purity, surface area, and particle shape. The following non-limiting examples of typical characteristics are included herein to exemplify the variation that may be encountered. Electrolytic iron is known for its high purity and high surface area. The particles are dendritic. Carbonyl iron particles are substantially uniform spheres, and may have a purity of up to about 99.5 percent. Carbon monoxide-reduced sponge iron typically has a surface area of about 95 square meters per kilogram ($m^2$/kg), while hydrogen-reduced sponge iron typically has a surface area of about 200 $m^2$/kg. Sponge iron may contain small amounts of other elements, for example, carbon, sulfur, phosphorus, silicon, magnesium, aluminum, titanium, vanadium, manganese, calcium, zinc, nickel, cobalt, chromium, and copper. Additional additives may also be used in molding the preform for the dual helical gear.

The powder metal preform is then sintered as illustrated in step 2 of FIG. 1. After being ejected from the preform die, the dual helical gear preform 5 is typically placed in a sintering furnace (step 2), where it is sintered as shown in FIG. 1. The sintering temperature is typically within the range of 2000° F. to 2400° F. and may be, for example, 2070° F. for certain iron-based preforms. Depending on, for example, the type of powder metal and the desired article, the sintering temperature can vary. After being sintered in the furnace (step 2), the helical gear preform 5 is normally cooled to room temperature. In an alternative embodiment of this invention, the preform is made by casting or machining steel into the desired toroidal shape.

The preform 5 is then ready for the lubrication operation 3 as illustrated in FIG. 1. In the lubrication step the preform 5 is coated with a high temperature lubricant that may be a commercially available lubricant such as boron, carbon or glass. The lubricated preform 5 is then delivered to a preform heater (step 4) where the preform 5 is heated to a temperature which is typically within the range of 1400° F. to 2100° F., for example, about 1850° F. However, the preform reheat temperature can vary depending on, for example, the alloy of metal powder being used and/or the characteristics of the article. Preferably, the sintered preform 5 is inductively heated; however, radiant heating and/or convection heating can also be used. Alternatively, this heating step may be eliminated and the preform can be removed from the sintering furnace (step 2) and while still hot can be placed into the hot forming mold (step 5). In another alternative embodiment of this invention, the hot form press tools can be lubricated as an alternative to lubricating the metal preform. It is, of course, possible to lubricate both the preform and the hot form press tools.

Figure 2A:
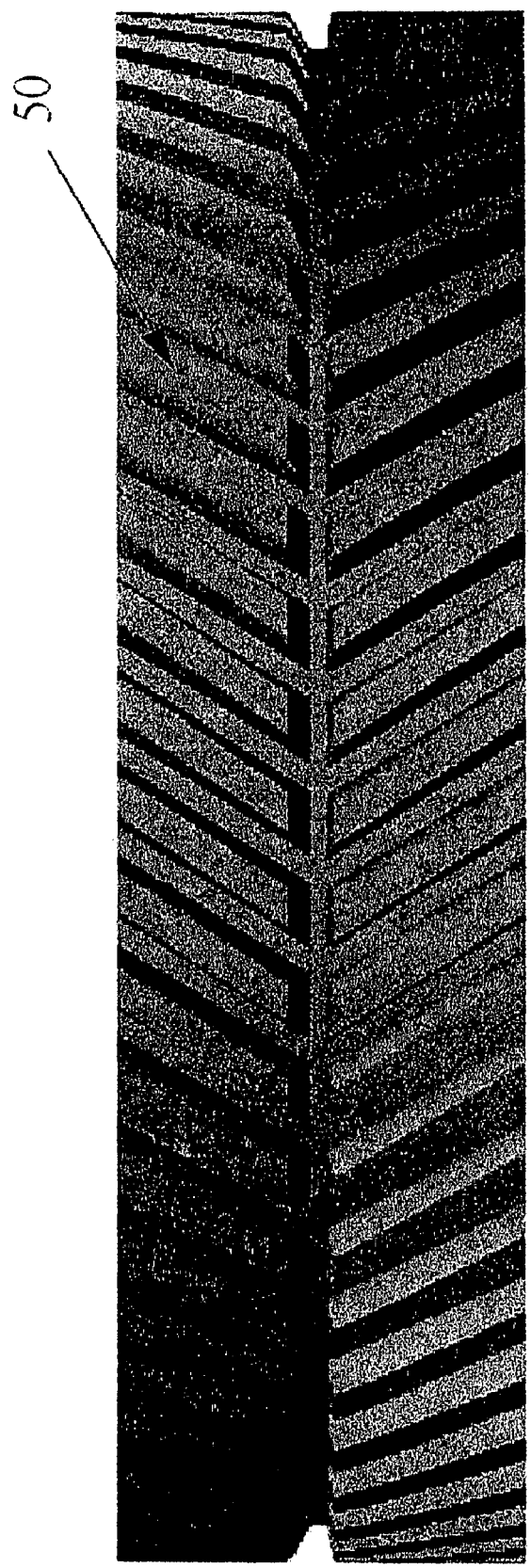
FIG. 2A is a side view of a dual helical gear according to an aspect of the invention.
Figure 2B:
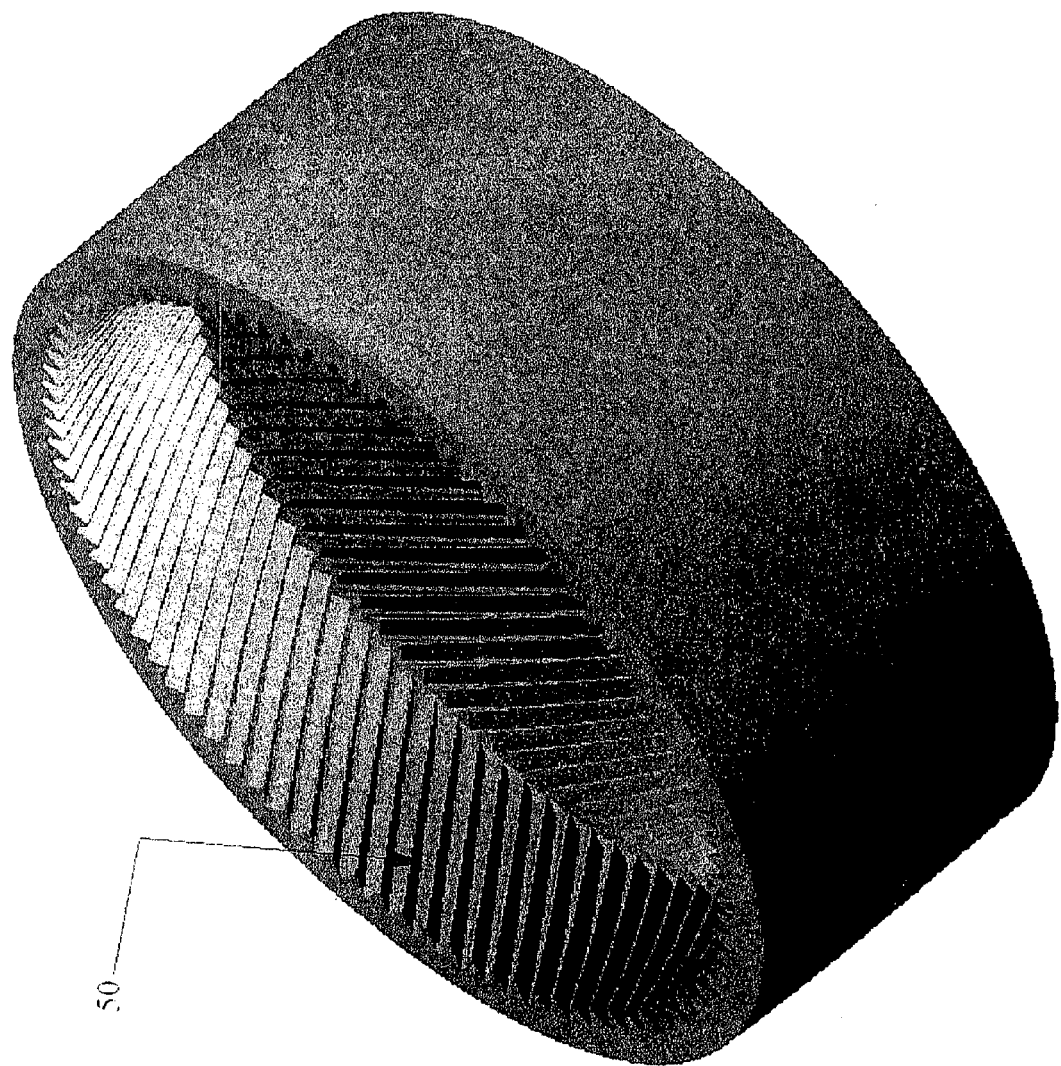
FIG. 2B is an isometric view of a dual helical gear according to an aspect of the invention.
Figure 2C:
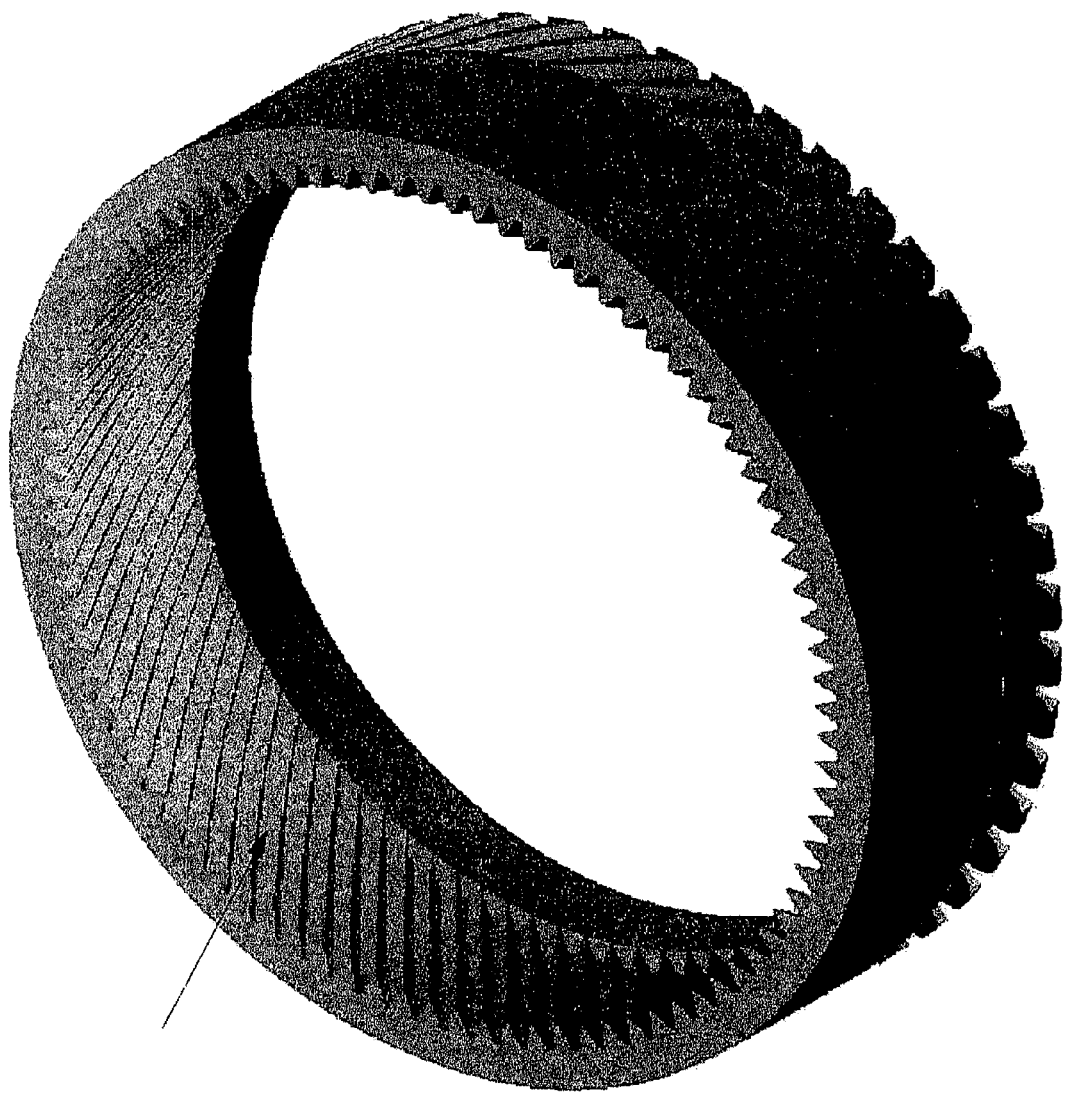
FIG. 2C is an isometric view of a dual helical gear according to an aspect of the invention.

The dual helical gears made by the technique of this invention can have both helical profiles on the external surface (see FIG. 2A), both helical profiles on the internal surface (see FIG. 2B), or one helical profile on the external surface, and one helical profile on the internal surface (see FIG. 2C).

In step 5 as illustrated in FIG. 1, the heated metal preform 5 is placed in a split mold cavity 10 of a spilt mold die 15. The split mold die 15 has a top die 20 and a bottom die 30, wherein the top die 20 has a top mold cavity 22 and the bottom die 30 has a bottom mold cavity 32. When the dual helical profile is needed externally, such as a typical herringbone gear, referring now to FIG. 3, according to an aspect of the invention, the top mold cavity 22 is a first helical gear shaped 24 cavity, and the bottom mold cavity 32 is a second helical gear shaped 34 cavity.

The heated sintered powder metal preform 5 is then axially impacted with an upper punch 26 and a lower punch 36, with sufficient force to density the preform into a high density gear. The pressure required for impact is usually about 40 tsi, but can vary from 20 tsi to 90 tsi depending on the material and type of the preform 5. In order to appropriately impact the preform 5, at least one of the punches 26/36 have teeth which mate with the helical gear shape of the corresponding mold cavity. This keeps the metal of the preform from flowing out of the cavity 10. If only one punch had mating teeth, the other punch would cover its corresponding mold cavity completely, blocking flow of the preform metal, and thus would not be able to punch down into the cavity. Whichever punch has teeth which mate with a helical gear shape is a rotating punch. Thus if the upper punch 26 has teeth which mate with the first helical gear shape 24, the upper punch 26 would rotate into the top mold cavity 22 following the first helical shape 24. FIG. 3 shows both the upper punch 26 and the lower punch 36 having mating teeth to the corresponding mold cavity. Thus in FIG. 3, both the upper and the lower punch rotate. In order to remove the completed part, at least one of either the top die 20 or bottom die 30 is a rotating die member. Typically it would be the top die 20 which would rotate off the part after impact.

In a preferred embodiment, the high density forged dual helical gear 50 does not have preformed helical teeth, such that when axially impacted, the preform 5 radially flows to fill the helical teeth of the mold cavity 10.

Figure 4:
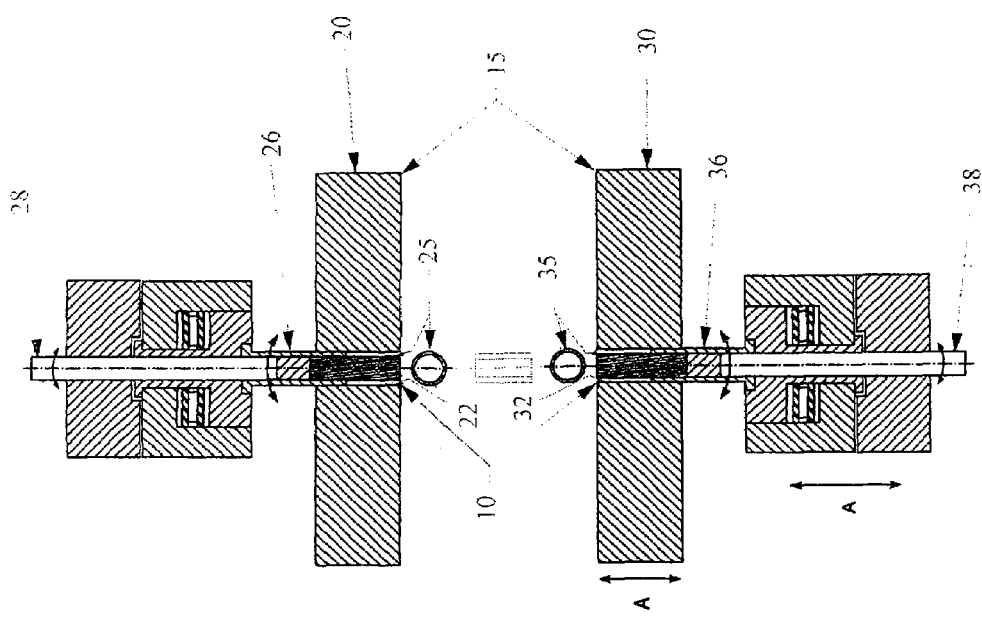
FIG. 4 is a sectional view of a gear press according to an aspect of the invention.

When the dual helical profile is needed internally (see FIG. 2B), referring now to FIG. 4, according to an aspect of the invention, the top die 20 has a top mold cavity 22 and the bottom die 30 has a bottom mold cavity 32. The top mold cavity 22 has a top core rod 28 with a first helical gear profile 25, and the bottom mold cavity 32 has a bottom core rod 38 with a second helical gear profile 35. The heated sintered powder metal preform 5 is placed in the split mold cavity 10, and axially impacted with an upper punch 26 and a lower punch 36. In order to appropriately impact the preform 5, at least one of the punches 26/36 has teeth which mate with the helical gear profile of the corresponding core rod. This keeps the metal of the preform from flowing out of the cavity 10. If only one punch had mating teeth, the other punch would cover its corresponding mold cavity completely, blocking flow of the preform metal, and thus would not be able to punch down into the cavity. Whichever punch has teeth which mate with a helical gear profile is a rotating punch. Thus if the upper punch 26 has teeth which mate with the first helical gear profile 25, the upper punch 26 would rotate into the top mold cavity 22 following the first helical profile 25. FIG. 4 shows both the upper punch 26 and the lower punch 36 having mating teeth to the corresponding core rod.

Thus in FIG. 4, both the upper and the lower punch rotate. In order to remove the completed part, at least one of either the top core rod 28 or the bottom core rod 38 is a rotating core rod. Typically it would be the top core rod 28 which would rotate out of the part after impact. If one of the top core rod 28 or the bottom core rod 38 is a non-rotating core rod, the corresponding punch is a rotating punch with a mating helical gear profile. This is to properly eject the part upon completion.

Figure 5:
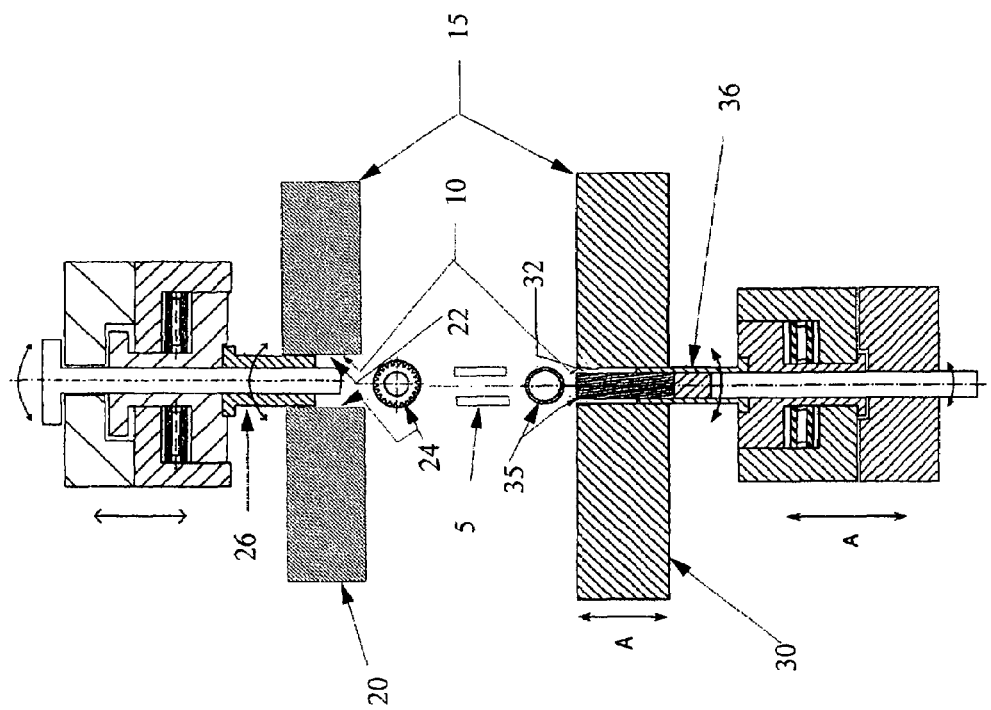
FIG. 5 is a sectional view of a gear press according to an aspect of the invention.
Figure 6:
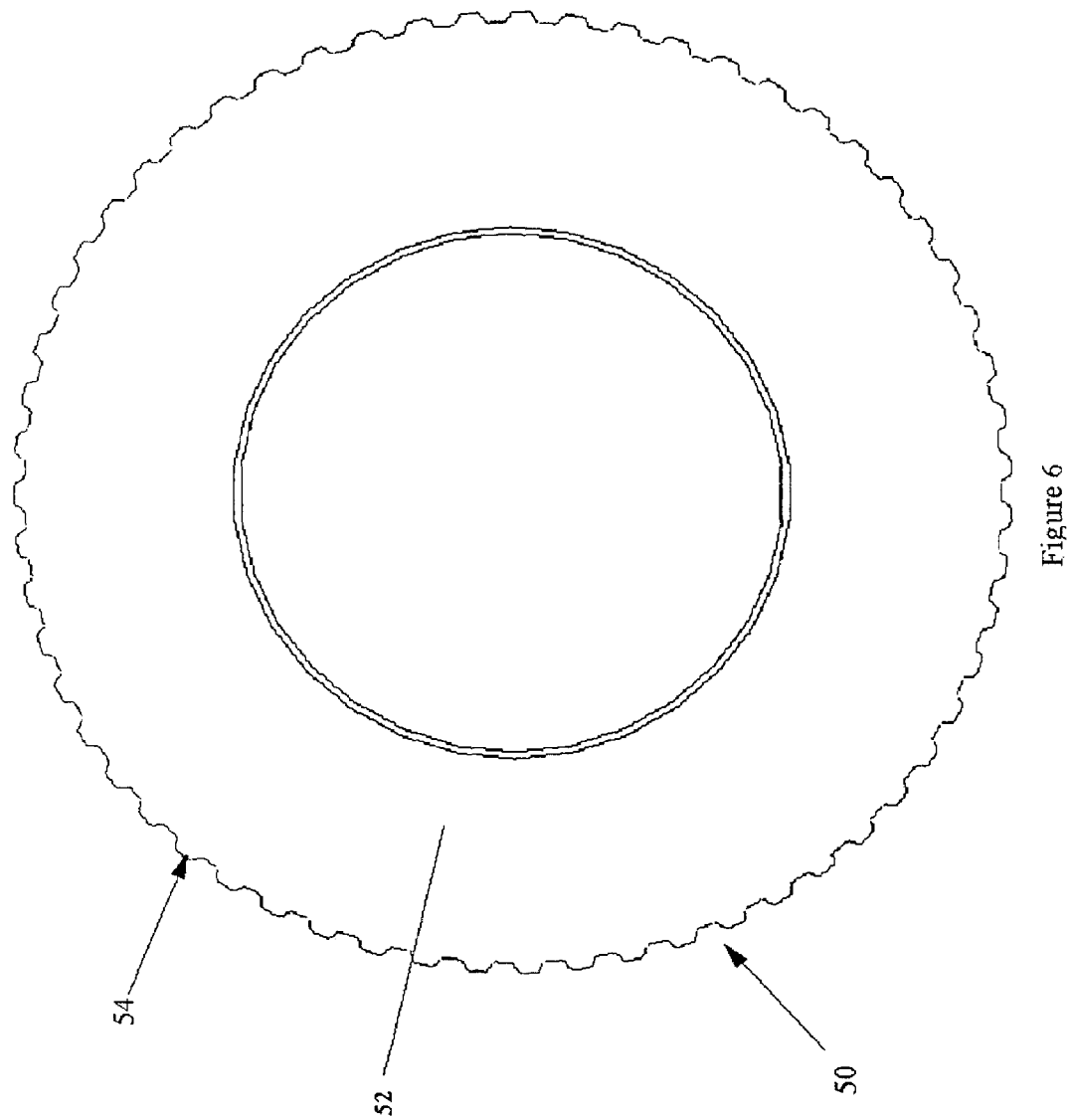
FIG. 6 is a top view of a gear according to an aspect of the invention.
Figure 7:
FIG. 7 is a micrograph of the teeth of a forged gear at 160× magnification with radial flow.
Figure 8:
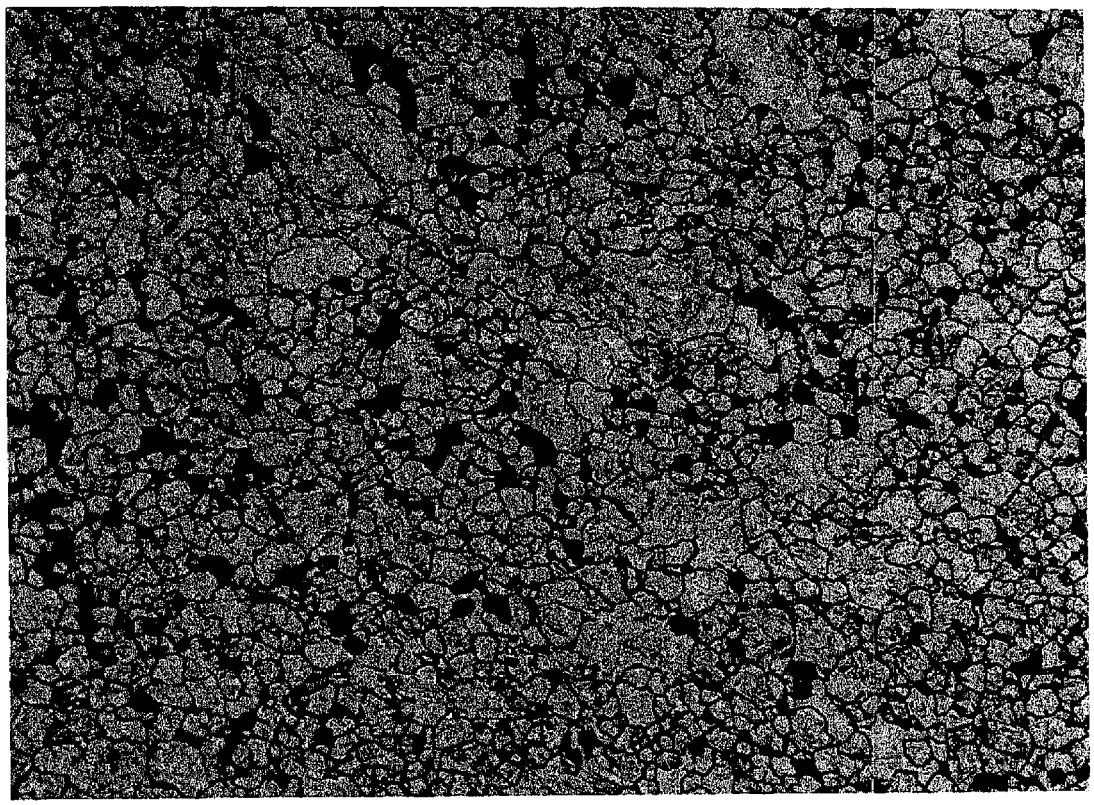
FIG. 8 is a micrograph of the teeth with of a gear at 160× magnification without flow made by just axial compaction.

Referring now to FIG. 5, according to an aspect of the invention, a high density forged dual helical gear 50 having an external first helical gear profile and an internal second helical gear profile is produced by a similar method. The top mold cavity 22 is a first helical gear profile 24 shaped cavity, and the bottom mold cavity 32 has a bottom core rod 38 with a second helical gear profile 35. The heated sintered powder metal preform 5 is placed in the split mold cavity 10 of the split mold die 15, and axially impacted with an upper punch 26 and a lower punch 28 with sufficient force to densify said preform into a high density gear.

In order to appropriately impact the preform 5, at least one of the punches 26/36 have teeth which mate with the corresponding helical gear profile. This keeps the metal of the preform from flowing out of the cavity 10. If only one punch had mating teeth, the other punch would cover its corresponding mold cavity completely, blocking flow of the preform metal, and thus would not be able to punch down into the cavity. Whichever punch has teeth which mate with a helical gear profile is a rotating punch. Thus if the upper punch 26 has teeth which mate with the first helical gear profile 24, the upper punch 26 would rotate into the top mold cavity 22 following the first helical profile 24. FIG. 5 shows both the upper punch 26 and the lower punch 36 having mating teeth to the corresponding core rod. Thus in FIG. 4, both the upper and the lower punch rotate. In order to remove the completed part, at least one of either the top die 20 or the bottom core rod 38 should rotate. Typically it would be the top die 20 which would rotate off of the part after impact, then the lower punch 36 would rotate the part up and out of the bottom cavity 32.

For all of these different variations the heated sintered powder metal preform 5 is heated to between 1400° F. to 2000° F. In a preferred embodiment of the invention, the split mold die is also heated. The die is preferably maintained at a controlled temperature, which will typically be about 600° F. After the heated preform 5 is placed in the split mold die 15, it is desirable for the hot forming step to be done quickly. The entire hot forming step can have a duration of, for example, only about one second or less. As stated above, the previous heating step may be eliminated by taking the hot preform 5 from the sintering furnace (step 2), and while still hot, placing the hot preform in the lubricated hot forming die (step 5).

After being ejected from the hot forming die in step 5, the densified dual helical gear is delivered to the cooling conveyor (step 6) where it can be cooled to room temperature as illustrated in FIG. 1. Then, the densified dual helical gear can be grit blasted, lubricated, and delivered to a burnishing press where it is placed in a burnishing die of the burnishing press (utilizing the general procedures described by the teachings of U.S. Pat. No. 6,044,555 and U.S. Pat. No. 6,592,809, the teachings of which are incorporated herein by reference in their entirety). At this stage the densified dual helical gear has not yet been heat treated (hardened) and thus is still somewhat malleable. Prior to the burnishing step, the densified dual helical gear may only be of class 3 or 4. However, after burnishing, the dual helical gear can have much more precise external dimensions and might be of class 7 through 10. This classification is defined by the American Gear Manufacturers of America (AGMA) and is readily known to those of ordinary skill in the art. Such gears are classified, in one respect, according to the precision with which the external dimensions are maintained to the specified dimensions during production. On a scale of 1 to 10, a class 1 gear would have external dimensions with the least degree of precision, whereas a class 10 gear would have external dimensions with the highest degree of precision.

Additional, final finishing treatments can be optionally performed after burnishing if desired. As illustrated in FIG. 1, for example, the densified dual helical gear is hardened by heat treating. Also, the densified helical gear can be machined or ground to desired axial lengths. Further, the smooth surfaces can be machined or ground to a desired diameter, for example, the bore of the gear can be sized. Further, the densified dual helical gear profile can be shaved and/or rolled to obtain an even more precise tooth profile. Other finishing treatments include rolling, heat treating, inductive heating, and shot peening.

According to an aspect of the invention, the high density forged dual helical gear 50 has a density of greater than 92% of theoretical density. According to a further aspect of the invention, a forged metal herringbone gear 50 is comprised of a body 52 and a plurality of teeth 54. Wherein the metal has a density of greater than 92% of theoretical and wherein the grain in the teeth 54 is at least one range higher on the ASTM E 112 grain size chart than the grain in the body 52 of the gear 50. According to a further aspect of the invention, the grain in the teeth 54 is two ranges higher on the ASTM E 112 grain size chart than the grain in the body 52 of the gear 50. According to a further aspect of the invention, the grain in the teeth 54 is three ranges higher on the ASTM E 112 grain size chart than the grain in the body 52 of the gear 50. Typically, the grain in the teeth 54 is one to three ranges higher on the ASTM E 112 grain size chart than the grain in the body 52 of the gear 50.

According to a further aspect of the invention, the forged metal herringbone gear 50 has a density of greater than 94% of theoretical. In a preferred embodiment, the forged metal herringbone gear 50 has a density of greater than 96% of theoretical. In a more preferred embodiment, the forged metal herringbone gear 50 has a density of greater than 98% of theoretical.

While certain representative embodiments and details have been shown for the purpose of illustrating the subject invention, it will be apparent to those skilled in this art that various changes and modifications can be made therein without departing from the scope of the subject invention.

What is claimed is:

1. A forged metal herringbone gear which is comprised of a body and a plurality of teeth wherein the metal has a density of greater than 92% of theoretical and wherein the grain in the teeth is at least one range higher on the ASTM E 112 grain size chart than the grain in the body of the gear.

2. A forged metal herringbone gear as specified in claim 1 wherein the grain in the teeth is two ranges higher on the ASTM ED 112 grain size chart than the grain in the body of the gear.

3. A forged metal herringbone gear as specified in claim 2 wherein the metal has a density of greater than 96% of theoretical.

4. A forged metal herringbone gear as specified in claim 1 wherein the grain in the teeth is three ranges higher on the ASTM E 112 grain size char than the grain in the body of the gear.

5. A forged metal herringbone gear as specified in claim 4 wherein the metal has a density of greater than 98% of theoretical.

6. A forged metal herringbone gear as specified in claim 1 wherein the metal has a density of greater than 94% of theoretical.

* * * * *